(12) United States Patent
Kong et al.

(10) Patent No.: US 9,413,249 B2
(45) Date of Patent: Aug. 9, 2016

(54) SECONDARY-SIDE DYNAMIC LOAD DETECTION AND COMMUNICATION DEVICE

(71) Applicant: Dialog Semiconductor Inc., Campbell, CA (US)

(72) Inventors: Pengju Kong, San Jose, CA (US); Henry Wong, Cupertino, CA (US); Wesley Ma, Fremont, CA (US); Judy Sha, Cupertino, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 14/557,260

(22) Filed: Dec. 1, 2014

(65) Prior Publication Data

US 2016/0028314 A1 Jan. 28, 2016

Related U.S. Application Data

(63) Continuation-in-part of application No. 14/340,482, filed on Jul. 24, 2014.

(51) Int. Cl.
*H02M 1/08* (2006.01)
*H02M 3/335* (2006.01)
*H02M 1/00* (2006.01)

(52) U.S. Cl.
CPC ............ *H02M 3/33507* (2013.01); *H02M 1/08* (2013.01); *H02M 2001/0003* (2013.01); *H02M 2001/0032* (2013.01)

(58) Field of Classification Search
CPC .................... H02M 3/33592; H02M 3/33507; H02M 1/08; H02M 2001/0003; H02M 2001/0009; H02M 2001/0054; H02M 3/156; Y02B 70/1475; Y02B 70/1433; H03K 17/74
See application file for complete search history.

(56) References Cited

U.S. PATENT DOCUMENTS

2010/0110732 A1* 5/2010 Moyer ............. H02M 3/33592
363/19
2011/0012538 A1* 1/2011 Ren ................... H02M 3/33592
315/307

(Continued)

FOREIGN PATENT DOCUMENTS

DE 10001866 A1 8/2001

OTHER PUBLICATIONS

German Office Action, German Application No. 10 2015 211 861.4, Apr. 7, 2016, 6 pages (with concise explanation of relevance).

*Primary Examiner* — Adolf Berhane
*Assistant Examiner* — Henry Lee, III
(74) *Attorney, Agent, or Firm* — Fenwick & West LLP

(57) ABSTRACT

A switching power converter provides regulated voltage to a load. The switching power converter comprises a transformer including a primary winding coupled to an input voltage and a secondary winding coupled to an output of the switching power converter. The switching power converter further comprises a power switch coupled to the primary winding and a rectifier coupled to the secondary winding. Current is generated in the primary winding responsive to the power switch being turned on and not generated responsive to the power switch being turned off. A detection circuit measures a voltage across the rectifier. If the detection circuit detects a decrease in the voltage across the rectifier outside of a blanking period, the detection circuit generates a current pulse in the secondary winding of the transformer. A fast power-on-reset device generates a startup signal to activate the detection circuit at an end of the blanking period.

20 Claims, 10 Drawing Sheets

(56) References Cited

U.S. PATENT DOCUMENTS

| | | |
|---|---|---|
| 2011/0096573 A1 | 4/2011 | Zhu et al. |
| 2012/0176827 A1* | 7/2012 | Malinin ............ H02M 3/33592 363/127 |
| 2013/0088898 A1* | 4/2013 | Gao ...................... H02M 3/335 363/21.16 |
| 2014/0098578 A1 | 4/2014 | Halberstadt |

* cited by examiner

SECONDARY-SIDE DYNAMIC LOAD DETECTION AND COMMUNICATION DEVICE

CROSS-REFERENCE TO RELATED APPLICATION

This application is a continuation-in-part of U.S. patent application Ser. No. 14/340,482, filed Jul. 24, 2014, which is incorporated herein by reference in its entirety

BACKGROUND

This disclosure relates generally to a switching power supply and more particularly to a switching power converter detecting dynamic loads via a secondary-side detection device.

Many electronic devices, including smart phones, tablets, and portable computers, employ power supplies providing controlled and regulated power output over wide operating conditions. These power supplies often include a power stage for delivering electrical power from a power source to a load across a transformer. A switch in the power stage electrically couples or decouples the load to the power source, and a switch controller coupled to the switch controls on-time and off-time of the switch. Regulation of the power output can be accomplished by, among other things, measuring the output current or output voltage and feeding that back to the primary-side switch controller. In order to improve cost performance and reduce size, many commercially available isolated power supplies employ primary-only feedback and control. By sensing primary side signals, the secondary output and load condition can be detected and thus be controlled and regulated.

For convenience, end users often leave the power supply connected to the AC mains at times when no load is connected to the power supply output. To maintain a regulated output voltage even in no-load conditions, the controller may change its regulation mode under low load or no-load conditions. Under no-load conditions, the rate of the pulses that turn on or turn off the power switch of the switching power converter is decreased significantly in order to maintain output voltage regulation, resulting in long periods of time between ON and OFF cycles of the switching power converter. This presents a significant challenge to primary-side sensing control schemes that rely on the ON and OFF cycles of the power switch to obtain a feedback signal. During the periods between ON cycles of the switch, the status of the output voltage is unknown by the controller as no feedback signal is generated. If the electronic device is reconnected to the power supply, representing a dynamic load change, during one of the long OFF cycles of the switch, the primary-side controller does not receive feedback about the change in the secondary side output voltage until the next ON cycle of the switch. In the interim, the output voltage may therefore drop significantly, exceeding the allowable voltage drop specified by the regulation specifications of the switching power converter or the electronic device.

SUMMARY

A switching power converter detects load transients at an output of the switching power converter using a secondary-side detection device. In one embodiment, the switching power converter comprises a transformer including a primary winding coupled to an input voltage and a secondary winding coupled to an output voltage of the switching power converter. A power switch is coupled to the primary winding of the transformer, and a rectifier is coupled to the secondary winding of the transformer. Current is generated in the primary winding responsive to the power switch being turned on and is not generated responsive to the power switch being turned off The rectifier provides a rectified current to the output of the switching power converter during off cycles of the power switch.

A detection circuit, coupled across the rectifier on the secondary-side of the transformer, measures a voltage across the rectifier. During off cycles of the power switch, the voltage across the rectifier is indicative of the output voltage of the switching power converter. If the voltage across the rectifier falls below a threshold value outside of a blanking period, the detection circuit detects the voltage drop and, in response, generates a current pulse in the secondary winding of the transformer. A fast power-on-reset (POR) device coupled to the detection circuit generates a startup signal to activate the detection circuit at an end of the blanking period, enabling the detection circuit to detect the voltage drop.

In one embodiment, a switch controller detects the voltage change on the primary side of the transformer as a result of the current pulse on the secondary side of the transformer. The switch controller turns on the power switch in response to detecting the pulse to regulate the output voltage of the switching power converter. The switching power converter therefore compensates for dynamic load conditions during off cycles of the power switch based on the current pulse generated by the detection circuit.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

Figure 1A:
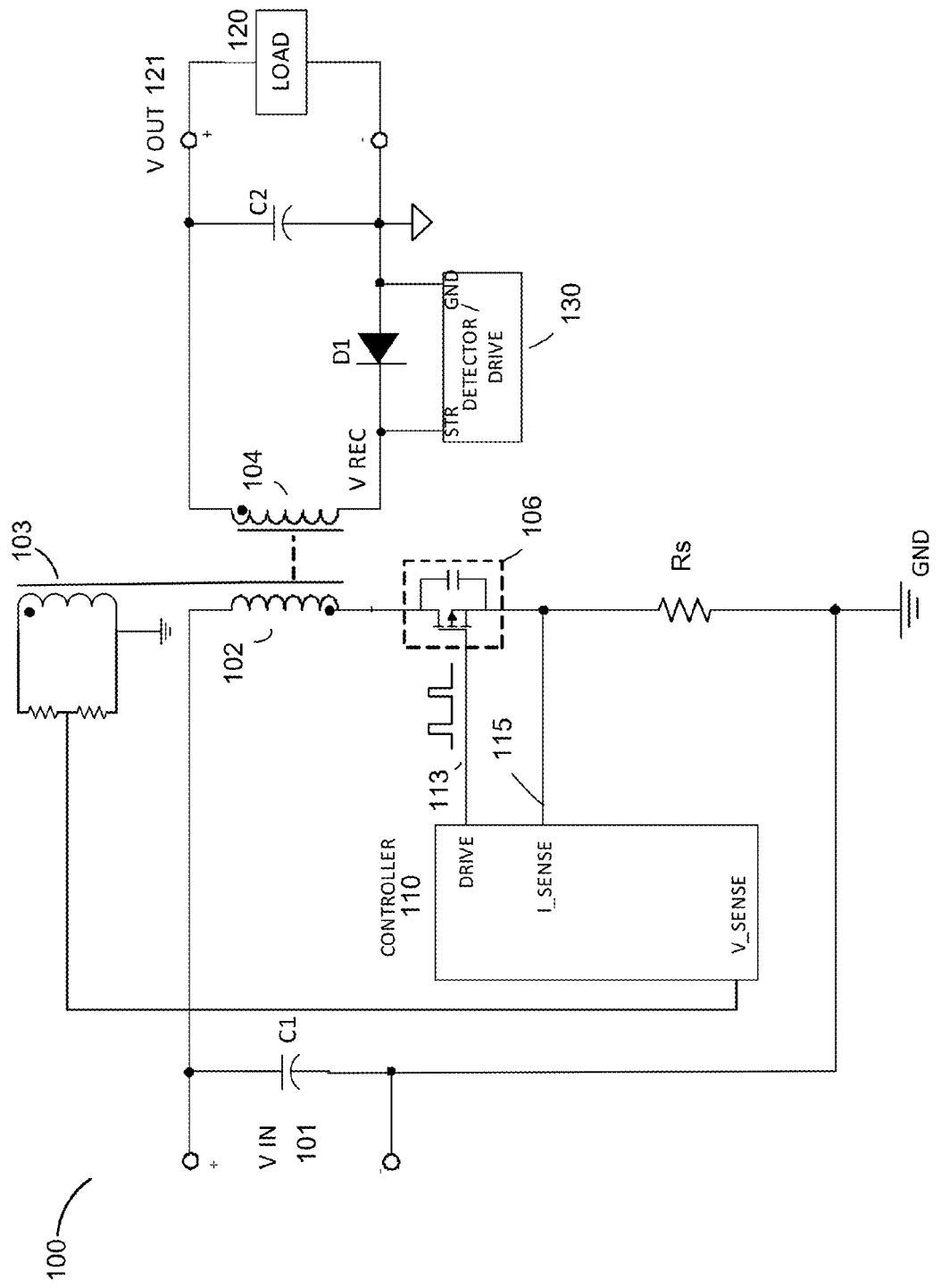
FIGS. 1A-1D illustrate various embodiments of a switching power converter.

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Embodiments of switching power converters described herein may be configured to (1) detect a dynamic load at an output of the switching power converter using a secondary-side detection device, and (2) signal a primary-side controller of the occurrence of a dynamic load, without impacting the feedback or regulation control loop, thus not impacting loop stability, and without increasing no-load power consumption. The controller regulates the output voltage by modifying the on and off times of the power switch based on the signal indicating a dynamic load.

FIGS. 1A-1D illustrate example embodiments of a switching power converter 100. In one embodiment, the switching power converter 100 includes, among other components, a transformer with primary winding 102, bias winding 103, and secondary winding 104, a power switch 106, and a controller 110.

Referring to FIGS. 1A-1D, the power converter 100 receives AC power from an AC power source (not shown), which is rectified to provide the regulated DC input voltage 101 across the input capacitor C1. Input voltage 101 is coupled to the primary winding 102. During ON cycles of the power switch 106, energy is stored in the primary winding 102 because the rectifier $D_1$ is reverse biased. The energy stored in the primary winding 102 is released to the secondary winding 104 and transferred to the load 120 across the capacitor C2 during the OFF cycles of the power switch 106 because the rectifier $D_1$ becomes forward biased. After the power switch 106 turns off, the rectifier D1 conducts current to the output of the switching power converter 100. At the end of the conduction period, the voltage across the rectifier D1 resonates due to the inductance and parasitic capacitance of the transformer. The rectifier $D_1$, which comprises, for example, a diode or a synchronous rectifier, rectifies the voltage of the secondary winding 104, and the capacitor C2 filters the voltage of the secondary winding 104 for outputting as output voltage 121 across load 120.

The primary-side controller 110 generates a control signal 113 to turn on or turn off power switch 106. The controller 110 senses current I_sense through the primary winding 102 in the form of a voltage 115 across a sense resistor Rs. The current I_sense is proportional to the current through the load 120 by a turns ratio of the transformer. The controller 110 also receives a sensed feedback voltage V_sense indicative of the output voltage 121, which may be generated in a variety of manners. In one embodiment, the voltage across the secondary winding 104 is reflected across a bias winding 103 of the transformer during OFF cycles of the power switch 106. In this case, the voltage across the bias winding 103 is divided by a resistor divider and input to the controller 110 as the sensed voltage V_sense. Any of a variety of other feedback mechanisms may be used to sense the output voltage 121 as feedback to the controller 110. The controller 110 controls switching of the power switch 106 to regulate the output voltage 121 based on V_sense or to regulate output current through the load 120 based on I_sense. The controller 110 can employ any one of a number of modulation techniques, such as pulse-width-modulation (PWM) or pulse-frequency-modulation (PFM), to control the ON and OFF states and duty cycles of the power switch 106 to regulate the output voltage 121 and current through the load 120.

The controller 110 is configured to operate the switching power converter 100 during a variety of load conditions, including when a load (e.g., an electronic device) is connected to the power supply and when a load is not connected. For example, in a constant voltage mode, the controller 110 supplies a regulated DC output of a fixed voltage within a specified tolerance range. Constant voltage mode generally indicates that the internal battery of the electronic device is fully charged and the fixed voltage output of the power supply provides the operating power for the electronic device to be operated normally. In a constant current mode, the power supply provides a fixed current output. Constant current mode generally indicates that the internal battery of the electronic device is not fully charged and the constant current output of the power supply allows for the efficient charging of the internal battery of the electronic device. Lastly, in a no-load condition, the electronic device is disconnected from the power supply. Under the no-load condition, the controller 110 may maintain a regulated voltage output from the power converter 100 in anticipation of the load being reconnected to the power supply.

Under light-load or no-load conditions, controller 110 may operate in PFM and reduce the switching frequency of power switch 106 in order to maintain regulation of output voltage 121. As the switching frequency of power switch 106 decreases, the time between measurements of the sensed voltage V_sense due to the OFF cycles of the power switch 106 increases. If the load 120 increases between measurements, the output voltage 121 drops until V_sense is sensed again and the controller 110 responds to the load change.

The detection circuit 130 detects changes in the load 120 between measurements of the feedback voltage in each off cycle of the power switch 106. The detection circuit 130 is coupled across the rectifier D1 on the secondary side of the transformer and measures a voltage V_REC across the rectifier. In embodiments of the switching power converter 100 having a diode as the rectifier D1, the detection circuit 130 includes a first pin coupled to the cathode of the rectifier D1 and a second pin coupled to the anode of the rectifier D1, and measures a voltage from the cathode to the anode of the rectifier D1. During a load transient, the voltage V_REC across the rectifier D1 as measured by the detection circuit 130 indicates a change in the output voltage 121. If the detection circuit 130 detects a load transient, the detection circuit 130 provides a low impedance between its pins, allowing current to flow through the secondary winding 104. The controller 110 detects the change in the sensed voltage V_sense as indication of the current in the secondary winding and controls switching of the power switch 106 to respond to the load transient. The detection circuit 130 therefore notifies the controller 110 of dynamic load conditions occurring during off cycles of the power switch 106, enabling the controller 110 to regulate the output voltage and compensate for the dynamic load before the output voltage 121 decreases significantly.

As shown in FIG. 1A, one embodiment of the power converter 100 has the rectifier D1 coupled between a secondary-side ground and the secondary winding 104, such that the detection circuit 130 is coupled to the secondary-side ground and the secondary winding 104. However, various alternative configurations of the detection circuit 130 relative to other components of the power converter 100 are also possible. In particular, because the detection circuit 130 detects a voltage across the rectifier D1, the detection circuit 130 does not need to be coupled to the secondary-side ground. Accordingly, the position of the rectifier D1 and detection circuit 130 may be varied to improve performance of the power converter 100 for electromagnetic interference or other considerations.

Figure 1B:
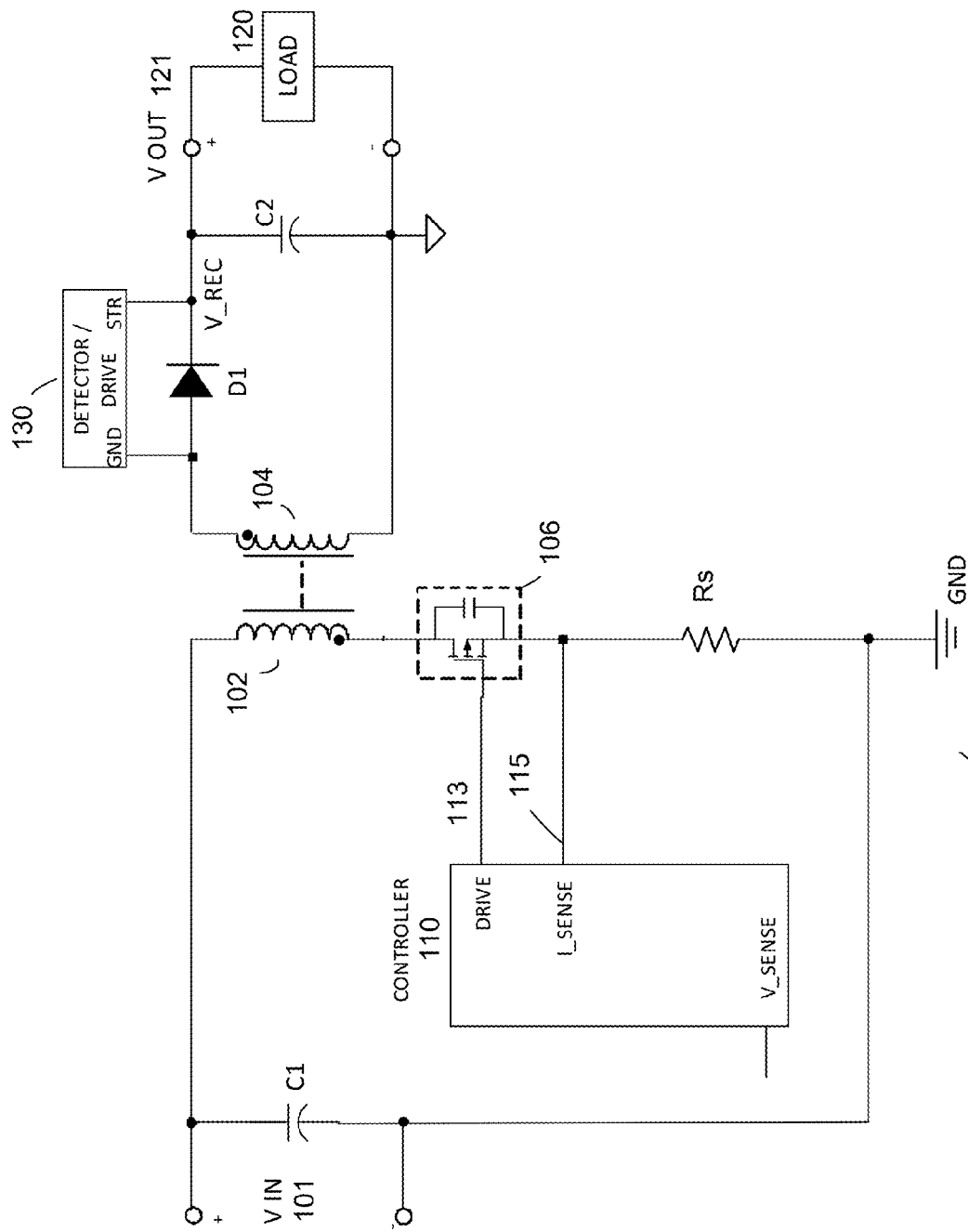

For example, FIG. 1B illustrates an alternative configuration of a switching power converter 100 with the detection circuit 130. In the example of FIG. 1B, the rectifier D1 is coupled between the secondary winding 104 of the transformer and the output capacitor C2, and the detection circuit 130 is coupled across the rectifier D1.

Figure 1C:
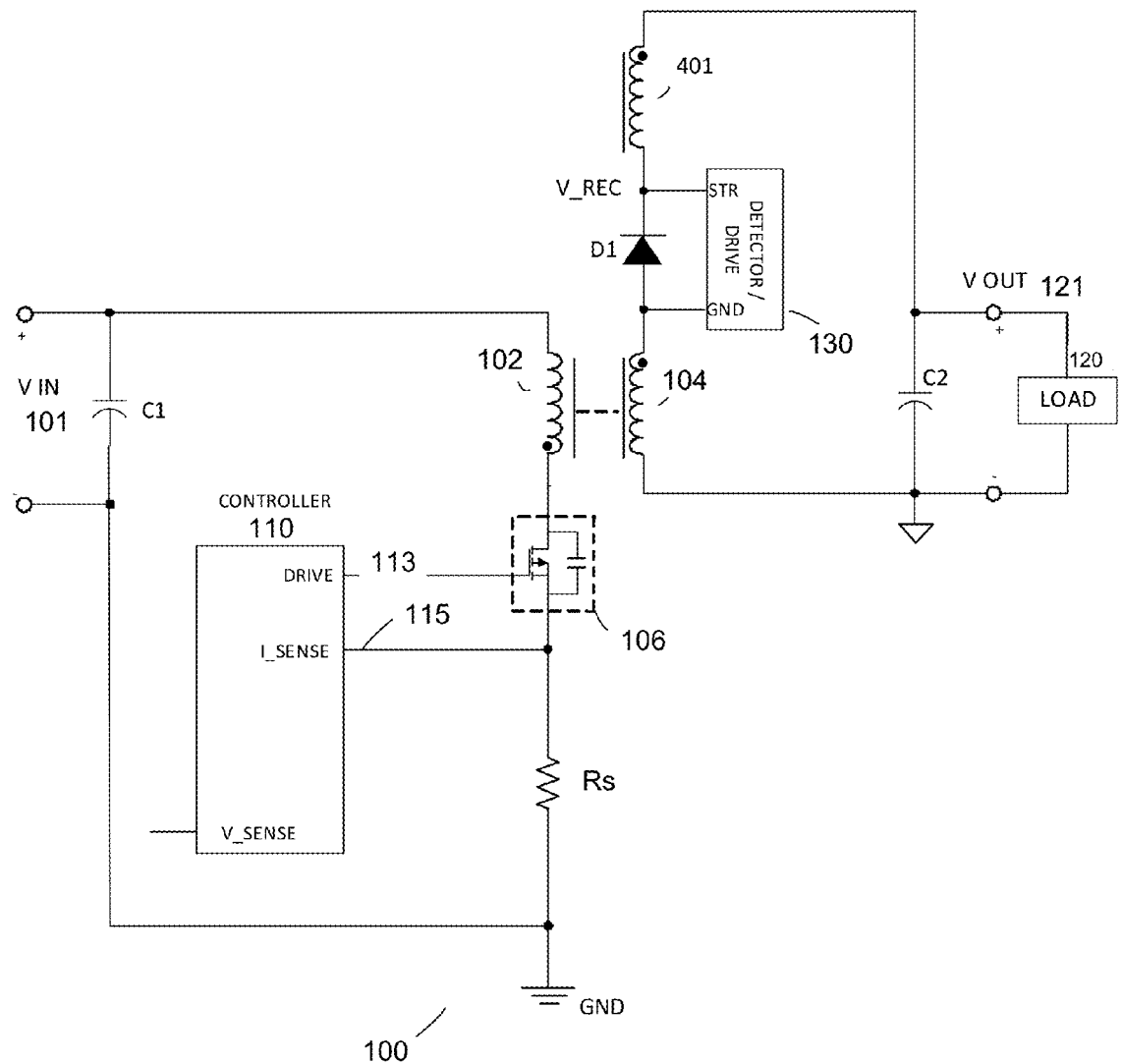

FIG. 1C illustrates another alternative configuration of a switching power converter 100 with the detection circuit 130. In the example of FIG. 1C, the rectifier D1 and detection circuit 130 are coupled between the secondary winding 104 and a second secondary winding 410 of the transformer.

Figure 1D:
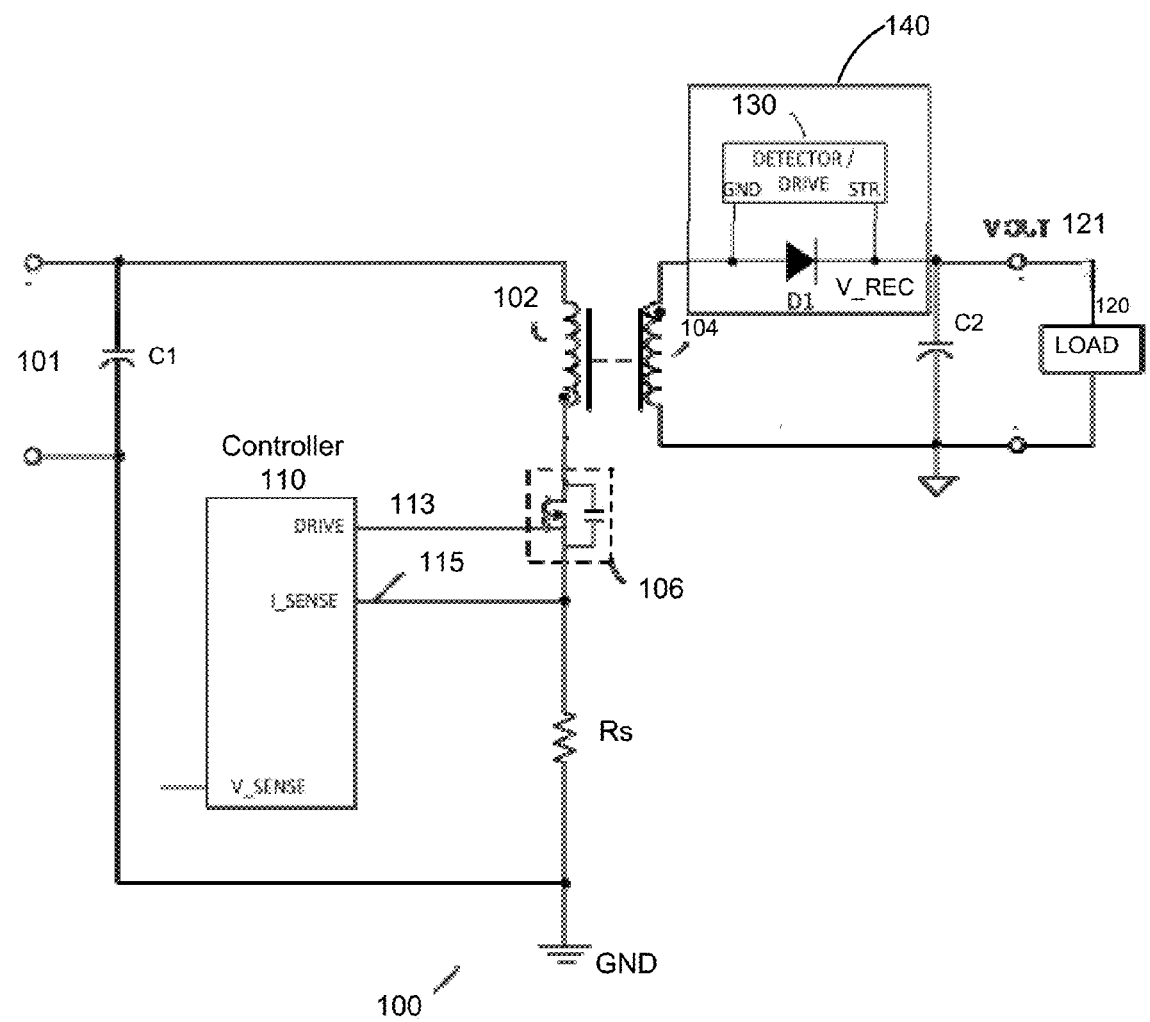

FIG. 1D illustrates yet another configuration of a switching power converter 100 with the detection circuit 130. In the example of FIG. 1D, the detection circuit 130 and rectifier (e.g., rectifier D1) are integrated into a smart diode 140, or single IC chip serving as a rectifier while providing dynamic load detection. The smart diode 140 is placed on a secondary side of the transformer. For example, FIG. 1D illustrates the smart diode 140 in series with the secondary winding 104 of the transformer and the output capacitor C2. However, other embodiments of the power converter 100 may have different configurations of the smart diode 140 relative to the secondary-side components of the transformer.

Figure 2A:
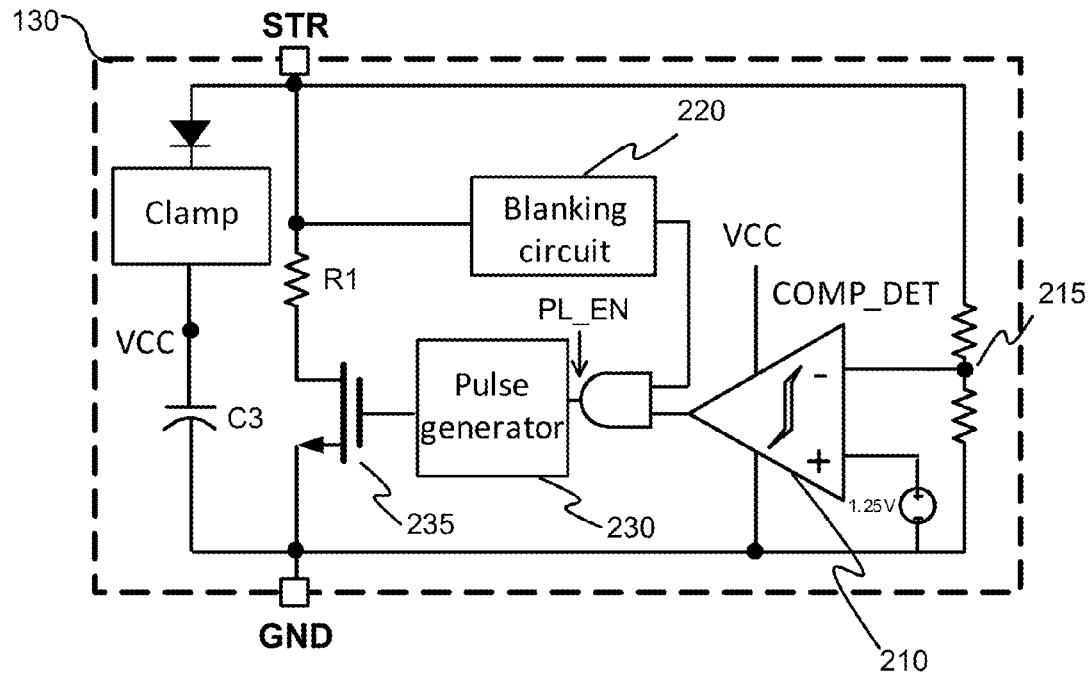
FIGS. 2A-2B illustrate example embodiments of a detection circuit.
Figure 2B:
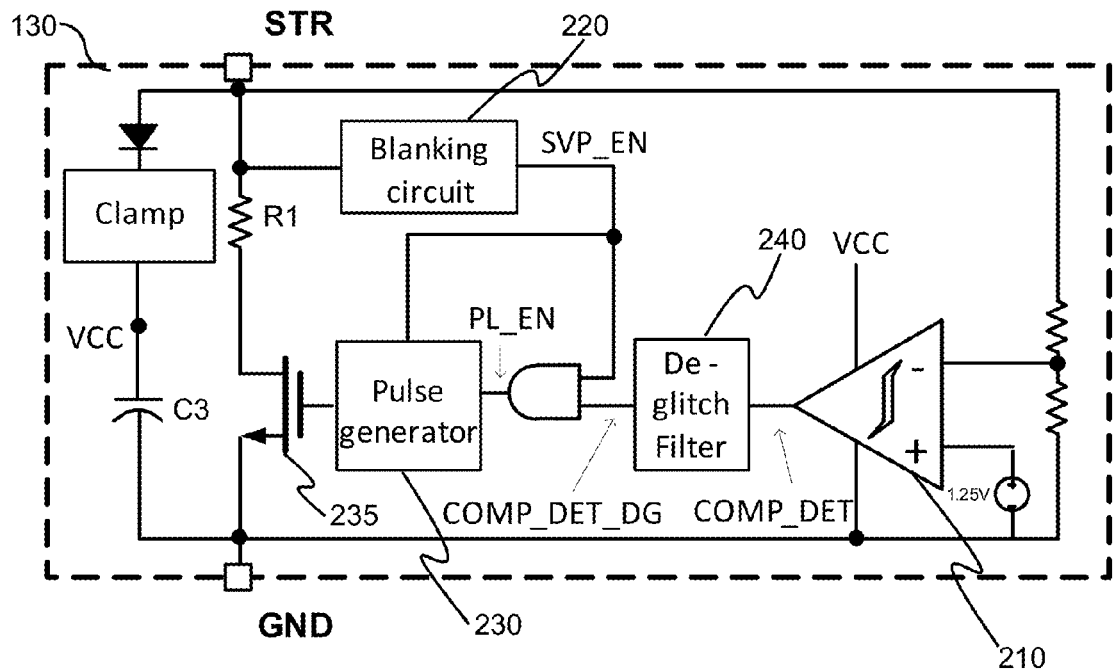

FIGS. 2A-2B are block diagrams illustrating example embodiments of the detection circuit 130. In one embodiment, as shown in FIG. 2A, the detection circuit 130 comprises a comparator 210, a blanking circuit 220, and a pulse generator 230. The detection circuit 130 has a first pin STR coupled to one side of the rectifier and a second pin GND coupled to the other side of the rectifier. Other embodiments of the detection circuit 130 may include additional or different components.

The pulse generator 230 turns on and turns off a bypass switch 235 based on the pulse enable signal PL_EN. If the pulse enable signal PL_EN is low, the pulse generator 230 is deactivated and does not turn on the bypass switch 235. In this state, the impedance between the pins of the detection circuit 130 is high. If the pulse enable signal PL_EN is high, the pulse generator 230 generates a control signal to turn on the bypass switch 235 for one or more short-duration pulses (e.g., each pulse 500 ns in duration). When the bypass switch 235 is turned on, the impedance between the pins STR and GND of the detection circuit 130 is equivalent to the resistor R1 and any internal resistance in the bypass switch 235 and wire. In one embodiment, the resistor R1 has a relatively small resistance, resulting in a low impedance between the two pins of the detection circuit 130 while the bypass switch 235 is turned on. The low-impedance path provided by the bypass switch 235 being turned on enables current to bypass the rectifier D1, generating a current in the secondary winding 104. The bypass switch 235 may be a MOSFET in some embodiments, as shown for example in FIG. 2A, or may be any of a variety of other types of switches.

The pulse enable signal PL_EN is generated based on an output of the comparator 210 and the blanking circuit 220. The voltage between the first and second pins STR and GND of the detection circuit 130 is divided by a resistor divider 215, and the divided voltage is input to the comparator 210. The comparator 210 compares the divided voltage to a threshold voltage (e.g., 1.25V) and outputs a binary high value if the divided voltage falls below the threshold voltage. The threshold voltage is, for example, set by a manufacturer of the load 120 as a lower boundary on the voltage specifications for the load 120.

The blanking circuit 220 outputs a binary high or low value to respectively enable or disable the pulse generator 230. In particular, as turning on the bypass switch 235 during an on pulse of the primary-side power switch 206 would allow current to bypass the rectifier D1 and therefore coupled the input and output capacitors C1 and C1, the blanking circuit 220 outputs a binary low value to disable the pulse generator 230 when the power switch 106 is turned on. Furthermore, to reduce false triggers of the detection circuit 130, the blanking circuit 220 may also disable the pulse generator 230 during at least a portion of a resonance period in which the transformer inductance and parasitic capacitance resonate. The blanking circuit 220 outputs a binary high value within a specified amount of time after the power switch 106 turns on, enabling the detection circuit 130 to detect to a change in the voltage across its pins until the power switch 106 turns on again.

In one embodiment, the blanking circuit 220 includes a comparator and a delay timer. The comparator detects either a rising edge of the voltage between the first and second pins of the detection circuit 130 or a falling edge of the voltage between the first and second pins as the voltage across the detection circuit 130 increases above a threshold voltage (e.g., output voltage 121) or falls below the threshold voltage, and activates the delay timer in response. The delay timer expires after a predefined amount of time. The output of the blanking circuit 220 is low before the delay timer expires, setting the pulse enable signal PL_EN to a low value. The output of the blanking circuit 220 is high after the delay timer expires, setting the pulse enable signal PL_EN to a high value if the output of the comparator 210 is also high.

Another embodiment of the blanking circuit 220 includes two comparators. The first comparator detects the time the voltage across the detection circuit 130 rises above an upper threshold voltage and outputs a high value while the voltage across the detection circuit 130 is above the upper threshold. The second comparator detects a time the operating voltage VCC falls below a lower threshold voltage and outputs a high value while VCC is below the lower threshold.

If the outputs of the blanking circuit 220 and the comparator 210 are both a binary high value, the pulse enable signal PL_EN becomes a binary high value. That is, if the voltage between the first and second pins of the detection circuit 130 falls below a threshold voltage outside of a specified time period after the power switch 106 turns on, the pulse enable signal PL_EN is high. Otherwise, the pulse enable signal PL_EN is low.

As the ringing period of the transformer inductance and parasitic capacitance may vary significantly, the time period over which the blanking circuit 220 deactivates the detection circuit 130 may also vary significantly. A shorter blanking period enables the detection circuit 130 to detect dynamic loads occurring during a larger portion of the switching cycle. However, if the blanking period is too short, the ringing may cause a false trigger of the detection circuit 130. To provide fast yet reliable detection of dynamic load conditions, another embodiment of the detection circuit 130, shown in FIG. 2B, includes a de-glitch filter 240 coupled between the comparator 210 and the pulse generator 230. In general, the de-glitch filter 240 reduces the effect of transformer ringing on the detectability of a change in the output voltage 121. The de-glitch filter 240 filters out pulses in a signal COMP_DET received from the comparator 210 that have an above-threshold magnitude and a below-threshold width. The de-glitch filter 240 generates a filtered signal COMP_DET_DG. The pulse enable signal PL_EN is high if the output of the blanking circuit 220 and the filtered signal COMP_DET_DG are high. The pulse generator 230 turns on the bypass switch 235 in response to the high pulse enable signal PL_EN.

A capacitor C3 stores the voltage Vcc for powering the various components of the detection circuit 130. In the embodiments of FIGS. 2A-2B, the capacitor C3 has a large capacitance to hold the Vcc voltage above an under voltage lockout (UVLO) level of the detection circuit 130 during the time the voltage across the detection circuit 130 is zero. Because the Vcc voltage is maintained above the UVLO level, the detection circuit 130 does not need to complete a startup sequence each time the voltage V_REC goes high. Accordingly, the large capacitance of the capacitor C3 enables the detection circuit 130 to quickly begin monitoring the voltage V_REC in each switching cycle of the power switch 106.

Figure 3A:
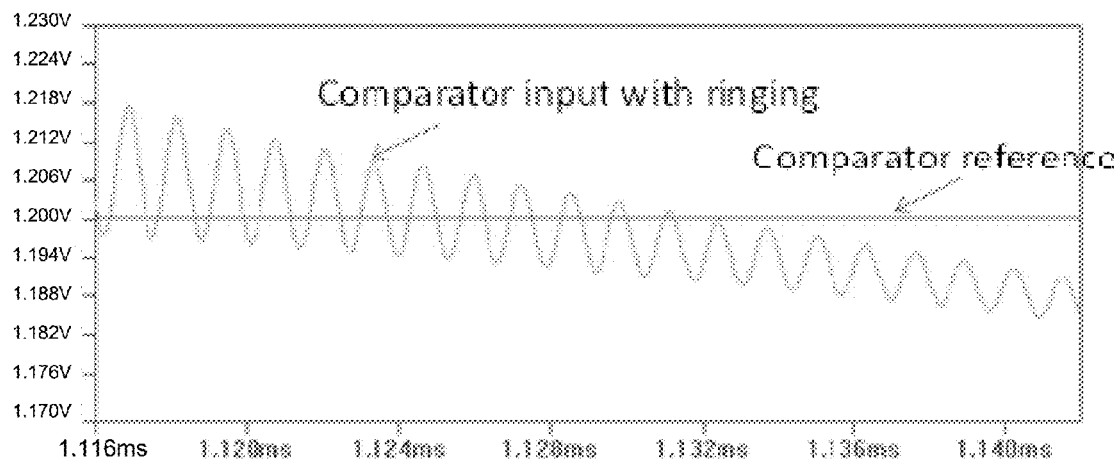
FIGS. 3A-3B are example waveforms illustrating signals in the detection circuit during a voltage ringing period.
Figure 3B:
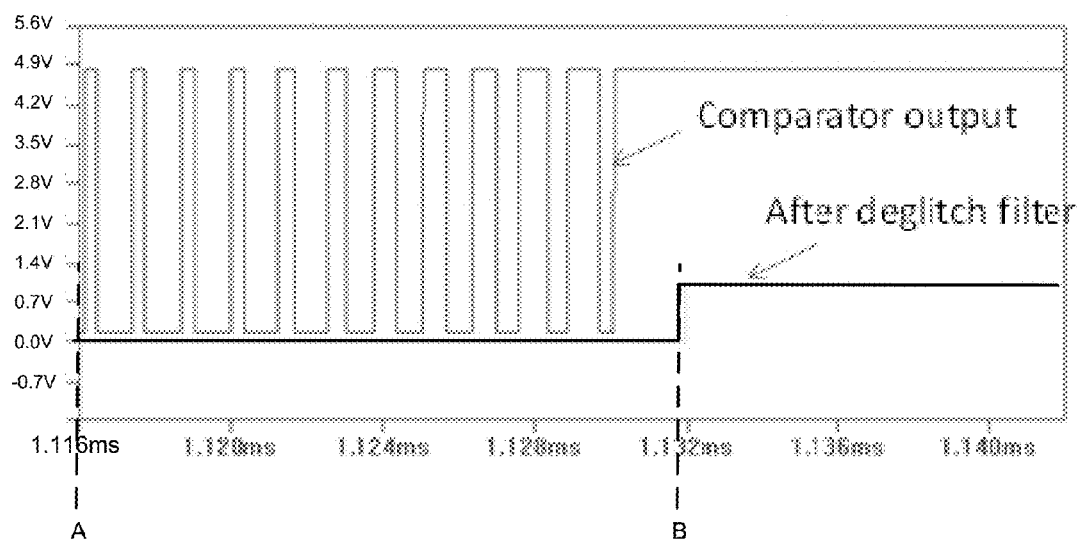

FIGS. 3A and 3B are example waveforms illustrating signals in the detection circuit 130 of FIG. 2B during a ringing period of the voltage V_REC. Specifically, FIG. 3A is an example waveform illustrating inputs to the comparator 210. Specifically, the comparator 210 receives a reference voltage defining a voltage threshold and the voltage output by the resistor divider 215. The voltage output by the resistor divider 215 oscillates around the reference voltage due to resonance of the transformer. FIG. 3B is an example waveform illustrating the output of the comparator 210 (that is, the input to the de-glitch filter 240) and the output of the de-glitch filter 240. As shown in FIG. 3B, the output of the comparator 210 switches between high and low values as the input of the comparator 210 oscillates around the reference value. The de-glitch filter 240 filters out the high-frequency oscillations in the comparator output signal, generating a smooth signal as shown in FIG. 3B. Between times A and B shown in FIGS. 3A and 3B, the comparator output oscillates between low and high values. The de-glitch filter 240 filters out the high-frequency oscillations and outputs a low value after time B.

Figure 4:
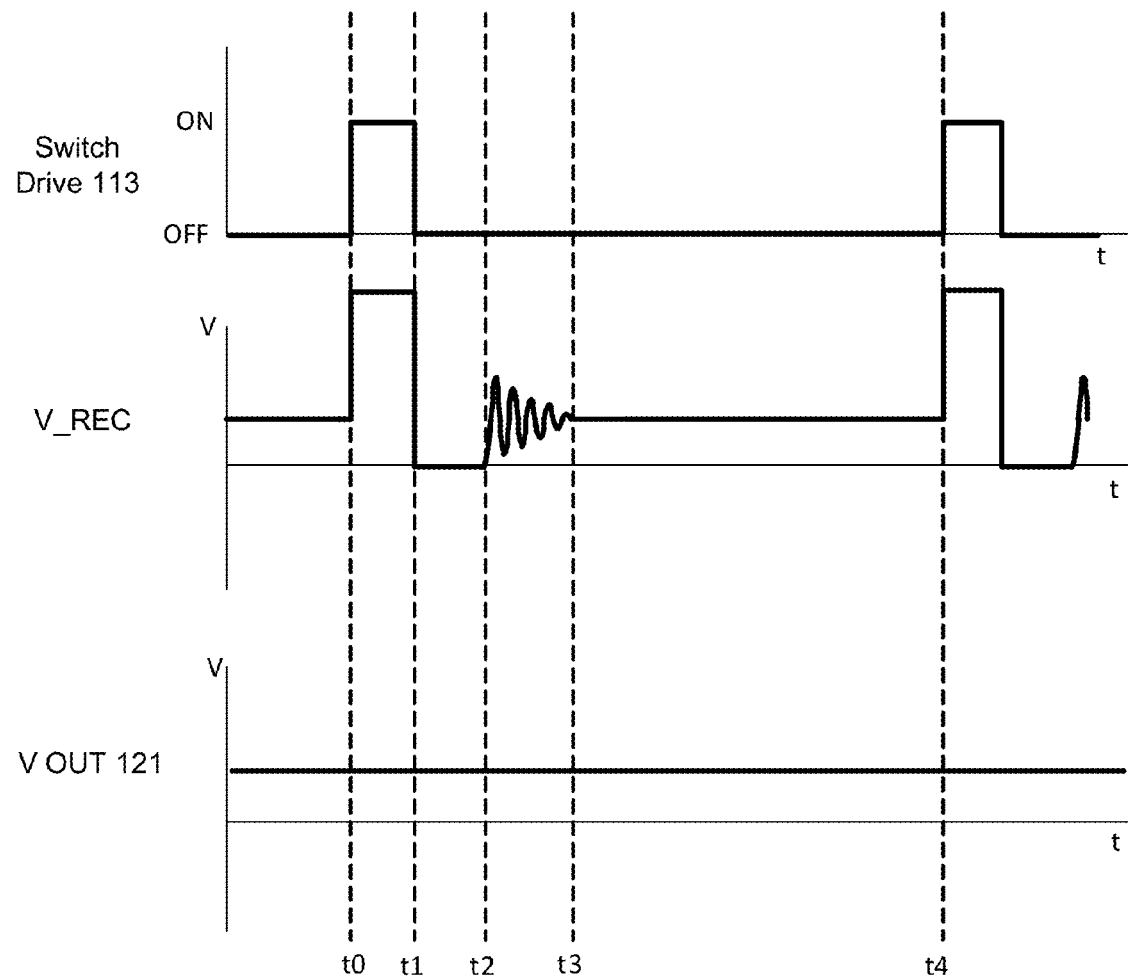
FIG. 4 illustrates example waveforms corresponding to a switching power converter during light- or no-load operation.

FIG. 4 illustrates example waveforms of embodiments of switching power converter 200 under constant-load conditions. At time t0, the switch drive signal 113 becomes high, turning on the primary-side power switch 106. The voltage V_REC across the secondary-side rectifier D1 increases in response to the power switch 106 turning on because the rectifier D1 becomes reverse biased. The switch drive signal 113 falls to a low value at time t1 to turn off power switch 106, forward biasing the rectifier D1 and causing the voltage V_REC to fall to a substantially zero value. The rectifier D1 conducts current to the output of the switching power converter 100 between times t1 and t2, and the voltage V_REC oscillates from time t2 to time t3 due to transformer leakage inductance and parasitic capacitance. The time t3 represents the time the magnitude of the oscillations falls below a threshold. The voltage V_REC remains substantially constant between times t3 and t4, at which time the switch drive signal 113 again becomes high to turn on the power switch 106. Thus, the period between times t0 and t4 represents a switching period of the transformer. The output voltage 121 across the load remains at a substantially constant value throughout the switching period. Because the output voltage 121 does not significantly change, the detection circuit 130 is not activated in the switching cycle shown in FIG. 4.

Figure 5:
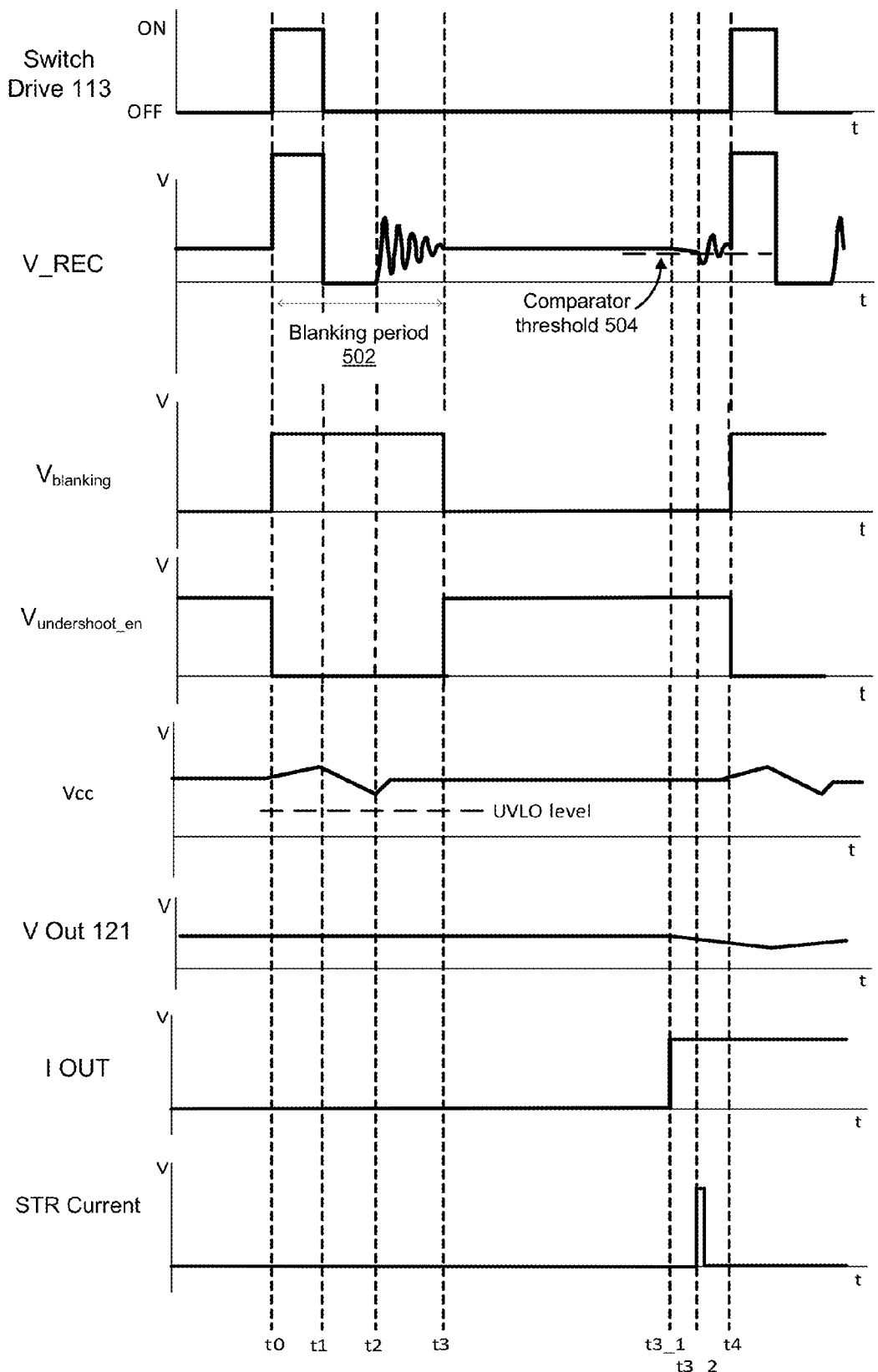
FIG. 5 illustrates example waveforms corresponding to a switching power converter with an applied load transient.

FIG. 5 illustrates example waveforms of embodiments of the power converter 100 during transient load conditions. Similar to FIG. 4, the switch drive signal 113 is high between times t0 and t1, resulting in the power switch 106 being on from t0 to t1. The voltage V_REC increases at the rising edge of the switch drive signal 113 and decreases at the falling edge of the switch drive signal 113, at time t1. The voltage V_REC oscillates from times t2 to t3, which represents a time the magnitude of the oscillations is greater than a threshold magnitude. At time t3_1, the load driven by the switching power converter 100 is increased, causing the output voltage 121 to begin falling. As the output voltage 121 decreases, the voltage V_REC also decreases until it falls below a comparator threshold 504 at time t3_2 (indicated by a horizontal dotted line in FIG. 5). In response to the voltage V_REC falling below the threshold, the detection circuit 130 activates the bypass switch 235, creating a low-impedance path between the two pins of the detection circuit 130. The low-impedance path enables current to bypass the rectifier D1, creating voltage spikes on the transformers windings and a current spike at the STR pin of the detection circuit 130. The controller 110 detects the voltage spikes on the primary side of the transformer. For example, the controller 110 detects voltage spikes across the primary winding 102 or the bias winding 103 of the transformer. In response to detecting the voltage spike, the controller 110 activates the power switch 106. Thus, the power switch 106 turns on at time t4.

In one embodiment, as shown in FIG. 5, the blanking circuit 220 deactivates the detection circuit 230 for a blanking period 502, or a period of time after t0. That is, the output V_blanking of the blanking circuit 220 is high during the blanking period 502 and is low outside of the blanking period 502. Accordingly, the bypass switch 235 of the detection circuit 130 is not activated during the blanking period 502 and the detection circuit 130 does not alert the controller 110 to changes in the output voltage 121. In one embodiment, a voltage V_undershoot_en is also low during the transformer reset time (between t1 and t2 in FIG. 5) to disable detection of undershoot of the output voltage Vout 121. The blanking period 502 includes the time the power switch 106 is on, as enabling the bypass switch 235 of the detection circuit 130 during the on-time of the power switch 106 would couple the input capacitor C1 to the output capacitor C2 and thereby generate a large current in the power converter 100. In one embodiment, the blanking period 502 also includes the time the secondary rectifier conducts current, as shown in FIG. 4 from t1 to t2, as the secondary rectifier voltage is close to zero which may falsely trigger the comparator 210. In one embodiment, the blanking period 502 also includes a portion of each off cycle of the power switch 106. For example, FIG. 5 illustrates the blanking period 502 extending from t0 (when the power switch 106 turns on) until t3 (when oscillations in the voltage V_REC fall below a threshold magnitude). The blanking period 502 may be shorter or longer in other embodiments. For example, in embodiments of the detection circuit 130 comprising a de-glitch filter 240 to compensate for the high-frequency oscillations between times t2 and t3, the blanking circuit 220 may output a low value from times t0 to t2 and otherwise output a high value. In this case, the blanking period 502 is the time between times t0 and t2.

In the embodiment illustrated in FIG. 5, the capacitor C3 of the detection circuit 130 has a relatively large capacitance, such that the operating voltage VCC does not fall below the UVLO level of the detection circuit 130 during the time V_REC is zero.

Figure 6:
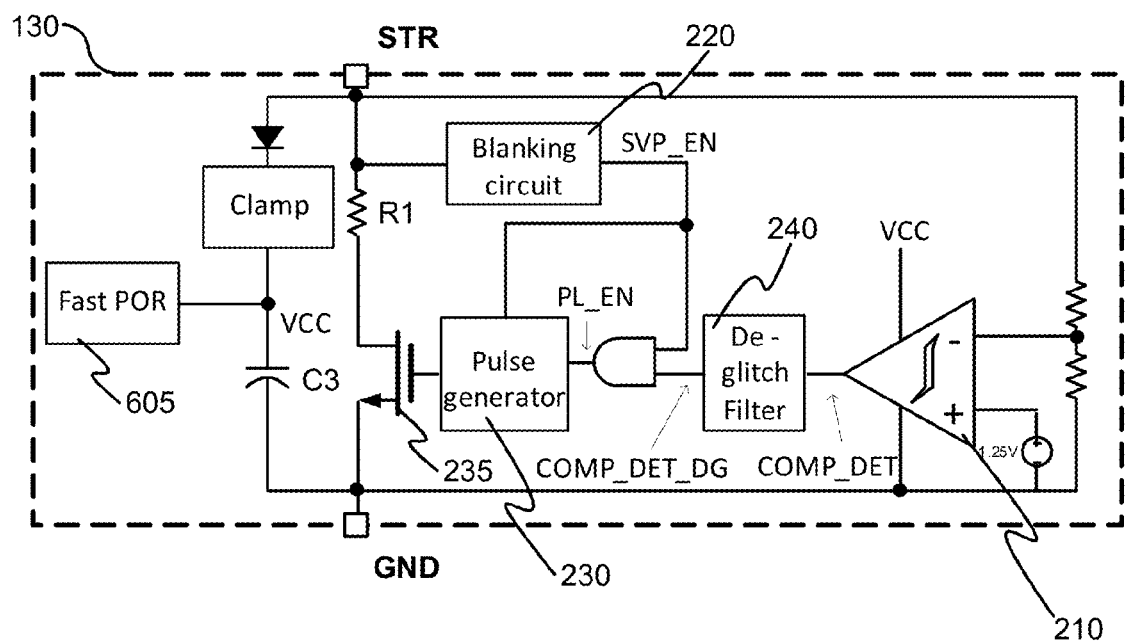
FIG. 6 illustrates another example embodiment of a detection circuit.

FIG. 6 is a block diagram illustrating another embodiment of the detection circuit 130. In the embodiment of FIG. 6, a fast power-on-reset (POR) device 605 is coupled to the detection circuit 130. The fast POR device 605 is configured to quickly start up the components of the detection circuit 130 between switching cycles of the power switch 106. For example, the fast POR device 605 starts up the components of the detection circuit 130 within several microseconds of the voltage V_REC going high. In one embodiment, the capacitor C3 has a lower capacitance than in the embodiments of FIGS. 2A and 2B, reducing the size of the capacitor C3 and thereby reducing the overall size of the detection circuit 130.

Figure 7:
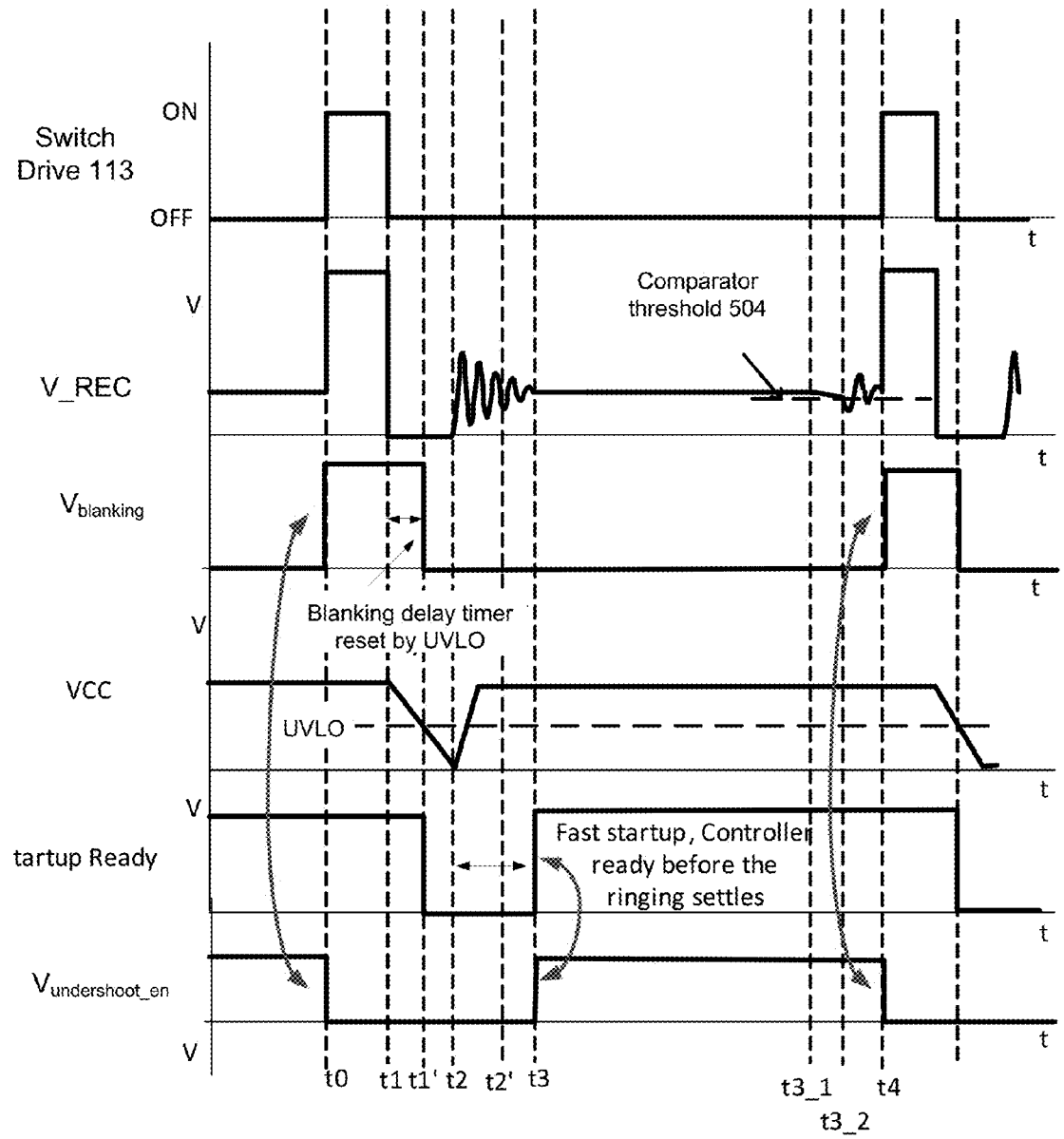
FIG. 7 illustrates example waveforms corresponding to a switching power converter with an applied load transient.

FIG. 7 illustrates example waveforms of the embodiment of the detection circuit 130 shown in FIG. 6. Similar to FIG. 5, the switch drive signal 113 is high between times t0 and t1, resulting in the power switch 106 being on from t0 to t1. The voltage V_REC increases at the rising edge of the switch drive signal 113 and decreases at the falling edge of the switch drive signal 113, at time t1. The voltage V_REC oscillates from times t2 to t3, and begins falling at time t3_1 in response to the load driven by the switching power converter 100 being increased. V_REC falls below the comparator threshold 504 at time t3_2, and the detection circuit 130 activates the bypass switch 235 in response.

Because the capacitor C3 of the embodiment of the detection circuit 130 associated with FIG. 7 has a relatively low capacitance, the operating voltage VCC begins decreasing at time t1 when the voltage V_REC falls to zero. At time t1', VCC falls below the UVLO level of the detection circuit 130, disabling the detection circuit 130. Furthermore, as shown in FIG. 7, the voltage V_blanking output by the blanking circuit 220 is high from time t0 to time t1'. For example, the high output is triggered in response to the rising edge of the voltage V_REC. The voltage V_blanking returns to low when the operating voltage VCC falls below the UVLO level. When the voltage V_REC begins oscillating at time t2 (that is, when V_REC is greater than zero), the capacitor C3 begins charging and the operating voltage VCC increases. The fast POR device 605 generates a startup signal to activate the components of the detection circuit 130 after the voltage VCC increases above the UVLO level. For example, the fast POR device 605 outputs a high startup ready signal when the detection circuit 130 is ready to detect changes in the voltage V_REC. While the startup ready signal is high, the detection circuit 130 is configured to detect decreases in the voltage V_REC and generate pulses detectable by the primary-side controller 110.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

Upon reading this disclosure, those of skill in the art will appreciate still additional alternative designs for the system. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in any claims drawn to the subject matter herein.

What is claimed is:

1. A switching power converter comprising:
    a transformer including a primary winding coupled to an input voltage and a secondary winding coupled to an output of the switching power converter;
    a power switch coupled to the primary winding of the transformer, current in the primary winding being generated responsive to the power switch being turned on and not generated responsive to the power switch being turned off;
    a rectifier coupled to the secondary winding of the transformer, the rectifier conducting a rectified current to the output of the switching power converter during off cycles of the power switch;
    a detection circuit measuring voltage across the rectifier, the detection circuit detecting a decrease in the voltage across the rectifier outside of a blanking period and generating one or more current pulses in the secondary winding of the transformer in response to detecting the voltage decrease; and
    a fast power-on-reset (POR) device coupled to the detection circuit, the fast POR device generating a startup signal to activate the detection circuit at an end of the blanking period.

2. The switching power converter of claim 1, wherein the detection circuit comprises:
    two pins coupled to respective sides of the rectifier; and
    a bypass switch, an impedance between the two pins being high responsive to the bypass switch being turned off and low responsive to the bypass switch being turned on.

3. The switching power converter of claim 2, further comprising a pulse generator coupled to the bypass switch, the pulse generator generating a control signal to turn on the bypass switch in responsive to a voltage between the two pins falling below a threshold voltage.

4. The switching power converter of claim 2, wherein the detection circuit comprises a blanking circuit turning off the bypass switch during the blanking period.

5. The switching power converter of claim 4, wherein the blanking circuit comprises:
    a comparator detecting an on-time of the power switch; and
    a delay timer adapted to turn on in response to the detected on-time of the power switch and turn off after a preset amount of time, wherein the blanking circuit turns off the bypass switch in response to the delay timer being turned on.

6. The switching power converter of claim 5, wherein the detection circuit comprises a de-glitch filter adapted to filter out a high frequency ringing of a voltage output by the comparator.

7. The switching power converter of claim 1, wherein the blanking period includes an on-time of the power switch.

8. The switching power converter of claim 7, wherein the blanking period further includes a portion of an off-time of the power switch while the rectifier conducts current to the output of the switching power converter.

9. The switching power converter of claim 1, wherein the voltage across the rectifier rings after the rectifier conducts current to the output of the switching power converter, and wherein the blanking period includes at least a portion of a time the voltage across the rectifier is ringing.

10. The switching power converter of claim 1, further comprising:
    a switch controller generating a control signal to turn on and turn off the power switch, the switch controller adapted to detect the current pulse generated by the detection circuit as a feedback voltage across one of the primary winding and a bias winding of the transformer, the switch controller adapted to turn on the power switch in response to detecting the current pulse.

11. A method for controlling a switching power converter, the switching power converter including a transformer with a primary winding coupled to an input voltage and a secondary winding coupled to an output of the switching power converter, a power switch coupled to the primary winding of the transformer, a rectifier coupled to the secondary winding of the transformer, and a detection circuit measuring voltage across the rectifier, the method comprising:
- generating a startup signal to activate the detection circuit at an end of a blanking period;
- detecting a decrease in a voltage across the rectifier outside of the blanking period; and
- responsive to detecting the voltage decrease, generating one or more current pulses in the secondary winding of the transformer.

12. The method of claim 11, further comprising:
- detecting the voltage across the rectifier by two pins coupled to respective sides of the rectifier;
- wherein generating the one or more current pulses comprises turning on a bypass switch, the bypass switch when on providing a low impedance path between the two pins.

13. The method of claim 12, further comprising generating a control signal to turn on the bypass switch in responsive to the voltage between the two pins falling below a threshold voltage.

14. The method of claim 12, further comprising turning off the bypass switch during the blanking period.

15. The method of claim 14, wherein turning off the bypass switch during the blanking period comprises:
- detecting an on-time of the power switch; and
- responsive to detecting the on-time of the power switch, turning on a delay timer having a preset expiration time, wherein the bypass switch is turned off in response to the delay timer being turned on.

16. The method of claim 11, further comprising applying a de-glitch filter to an output of a comparator, the comparator detecting the voltage drop across the rectifier, the de-glitch filter filtering out high frequency pulses in the output of the comparator caused by a ringing of the voltage across the rectifier.

17. The method of claim 11, wherein the blanking period includes an on-time of the power switch and a portion of an off-time of the power switch while the rectifier conducts current to the output of the switching power converter.

18. The method of claim 11, wherein the voltage across the rectifier rings in response to the secondary rectifier stops conduct current, and wherein the blanking period includes at least a portion of a time the voltage across the rectifier is ringing.

19. The method of claim 11, wherein the switching power converter further comprises a switch controller generating a control signal to turn on and turn off the power switch, the method further comprising:
- detecting the current pulse generated by the detection circuit by monitoring a voltage across one of the primary winding and a bias winding of the transformer; and
- turning on the power switch in response to detecting the current pulse.

20. A switching power converter, comprising:
- a transformer including a primary winding coupled to an input voltage and a secondary winding coupled to an output of the switching power converter;
- a power switch coupled to the primary winding of the transformer, current in the primary winding being generated responsive to the power switch being turned on and not generated responsive to the power switch being turned off; and
- a smart diode coupled to the secondary winding of the transformer, the smart diode comprising:
  - a rectifier conducting a rectified current to the output of the switching power converter during off cycles of the power switch;
  - a detection circuit measuring voltage across the rectifier, the detection circuit detecting a decrease in the voltage across the rectifier outside of a blanking period and generating one or more current pulses in the secondary winding of the transformer in response to detecting the voltage decrease; and
  - a fast power-on-reset (POR) device coupled to the detection circuit, the fast POR device generating a startup signal to activate the detection circuit at an end of the blanking period.

* * * * *